Patented Dec. 22, 1931

1,837,284

UNITED STATES PATENT OFFICE

BEVERLY OBER AND EDWARD H. WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

METHOD OF PRODUCING SOLUBLE PHOSPHATES

No Drawing. Application filed October 7, 1926. Serial No. 140,206.

The invention, generally stated, relates to the method of and the apparatus for the production of soluble phosphate from the naturally occurring insoluble phosphate rock.

More particularly, our invention has for its principal objects the following: the decrease in the time of production of soluble phosphate; the elimination of the apparatus now employed; and the substitution of other apparatus to decrease the cost of production by dispensing with a large portion of the labor and to produce a phosphate or the so-called super-phosphate having all of the advantages of the present super-phosphate but with a higher percentage of available phosphate than is practicable under present methods.

There are many other objects of the invention such, for example, as the production and use of nitrosylsulphuric acid or $SO_2(OH)(ONO)$ for the treatment of the phosphate rock.

To enable others skilled in this art to practice our invention, we will now describe the same in detail. It is to be understood, however, that the description is not to be considered as limiting our invention to the details thereof hereinafter set forth.

The apparatus preferably comprises means for the production of sulphur dioxide and oxides of nitrogen. A convenient method for the production of these gases is by the burning of sulphur and the oxidation of ammonia by passing the same over heated platinum, or these gases may be produced in a single step by utilizing the ordinary form of pyrites burners. The advantage of producing the gases separately is that by such production measured amounts thereof may be admitted into the autoclave containing phosphate rock and water to form with the water nitrosylsulphuric acid in such amount as to completely react with the phosphate rock. In any event means are provided in connection with an autoclave of any desired construction to introduce therein the said gases. We have found it advantageous to employ a horizontal rotary autoclave provided with a mixing device or paddle, although other types of autoclave may be utilized if desired.

The autoclave is provided with means for admitting the material to be treated and with the necessary connections with the pyrites burners for the introduction of the fumes or gases therefrom, as well as with means for venting the same when desired, and with means connecting the same to a vacuum producing device or pump, as will be described more in detail hereinafter.

In carrying out our process we prefer to follow the method which, as the result of numerous tests and experiments, has proved most satisfactory, but we have also discovered that certain changes and departures may be made in and from our preferred method without materially affecting the results.

The process consists in first grinding or pulverizing the phosphate rock to the necessary degree of fineness, then the ground rock, either as a dry powder or as a sludge (mixed with water) is run into the autoclave and the fumes or gases above described allowed to enter the autoclave and these gases at once react with the phosphate rock. It will be understood that if a dry powder is introduced into the autoclave instead of a sludge, the necessary amount of moisture shall be introduced at, prior or subsequent to the entry of the gases. The moisture may be introduced in the case of a dry powder either as water, vapor or steam, as desired.

The phosphate rock comprises principally tricalcium phosphate $CA_3P_4O_8$ and since a large percentage of the fumes or gases produced by either method is composed of oxides of nitrogen and sulphur dioxide, they will, when combined with the water in the autoclave, form a nitrosylsulphuric acid or anhydrid or nitrosyl. The nitrosyl then apparently reacts with the water to form sulphuric acid and oxides of nitrogen and the acid reacts with the tricalcium phosphate to convert the same into the monocalcium and the dicalcium phosphate. Since the reaction with the phosphate rock causes the production of carbon dioxide and hydrogen fluoride, it is desirable to leave the vent from the autoclave open to prevent a sudden rise in pressure within the same, particularly at the beginning of the reaction.

We have pointed out in our co-pending applications, Serial Numbers 105,566, 112,678, 117,170 and 119,741, that the reaction may be produced by the introduction of sulphuric acid or by the products of combustion of nitre and sulphur or by the use of sulphur trioxide and it is of course possible in each of these processes to cause the reaction between the phosphate rock and the reagents to take place before the mix is allowed to enter the autoclave. Should this step be used the vent or relief valve of the autoclave would be closed.

After the mixture in the autoclave has been allowed to react for a predetermined period, the exact time of which depends upon the chemical composition of the phosphate rock, the vent is closed and the autoclave may be and preferably is gently heated to speed up the reaction and to insure a more uniform reaction between all the phosphate rock and the reagents.

The heating of the autoclave causes a rise in pressure within the same and after the reaction is complete the heating is discontinued and the autoclave may then be subjected to the influence of a cooling medium such as air or water or brine and at the same time the vent or relief valve is opened and the pressure within the autoclave reduced to atmospheric. This sudden reduction in pressure results in a material reduction in temperature of the mass and tends to cause a rapid crystallization, and to remove all useless products such, for example, as spent gases and moisture, we subject the autoclave to a relatively high vacuum and to assist in the rapidity of the process we preferably apply heat during the evacuating period. In a short while, the time depending upon the degree of vacuum, the mass is thoroughly dry and may be discharged from the autoclave.

The term "pyrites burners" as used in the specification is to be understood in its generic sense and to include any method of producing sulphur dioxide and oxides of nitrogen and is not limited, of course, to the burning of pyrites.

It is also to be pointed out as one of the important advantages of our process that we are enabled to use phosphate rock of much coarser texture than has heretofore been deemed possible without detriment to the treatment of the rock and without affecting our final product. In fact, it is within our contemplation to utilize the autoclave by the introduction of balls or the like therein as a grinding medium so as to reduce the size of the phosphate rock within the autoclave to the desired degree of fineness. The use of the autoclave as a grinding device possesses many inherent advantages since the pulverizing devices within the autoclave material assist in the mixing of the product and also serve during the evacuating period to pulverize the product and thus eliminate grinding of the material.

By the above process it will be apparent that we have shortened the time of manufacture of eliminating the mixing pan, the den, and the long curing process. The material, when dumped from the autoclave may be immediately pulverized and bagged without any further process or steps and it has been found that this product is characterized by the entire absence of free acids and by a moisture content so low that there is no hardening of the product by the application of weight such as is caused by the stacking of the bags.

Having thus described our invention, what we claim as new and desire to secure by Letters Patent, is:

1. A process of manufacturing phosphatic fertilizer comprising mixing ground phosphatic material and nitrosylsulphuric acid, passing the substantially unset mixture to a confined space, agitating and digesting the mass under controlled superatmospheric pressure and temperature, and drying the product.

2. A process of preparing phosphatic fertilizer comprising mixing a water sludge of unavailable phosphatic rock dust with sulphur dioxide and oxides of nitrogen, which will react with phosphate rock to form available phosphates, passing the substantially unset mixture to a zone in which controlled pressures may be maintained and agitating and digesting the mixture under superatmospheric temperature and pressure.

3. A process of preparing phosphatic fertilizer comprising mixing unavailable phosphatic material with sulphur dioxide, oxides of nitrogen and water, which will react with the material to form available phosphates, passing the substantially unset mixture to a zone in which pressure may be maintained and the exothermic heats of reaction largely retained, and digesting the mixture in said zone under superatmospheric temperature and pressure while agitating the mass.

4. A process of preparing phosphatic fertilizer comprising mixing unavailable phosphatic material with nitrosylsulphuric acid, passing the substantially unset mixture to a zone in which pressure may be maintained and the exothermic heats largely retained, digesting the mixture in said zone under controlled superatmospheric temperature and pressure while agitating the mass and drying the products of reaction by releasing the pressure on the mixture while subjecting the same to the action of a cooling medium.

5. The process of manufacturing phosphatic fertilizer comprising digesting a mixture of finely divided phosphatic material and nitrosylsulphuric acid which will react with the material to produce available phosphatic salts, under controlled superatmospheric pressure and temperature while agitating the mass.

6. A process of preparing phosphatic fertilizer comprising mixing a water sludge of unavailable phosphatic rock dust with sulphur dioxide and oxides of nitrogen, which will react with phosphate rock to form available phosphates, passing the substantially unset mixture to a zone in which controlled pressures may be maintained, agitating and digesting the mixture under superatmospheric temperature and pressure, and subsequently releasing the pressure on said zone, cooling the material therein to effect crystallization of the solid reaction product.

7. A process of preparing phosphatic fertilizer comprising mixing a water sludge of unavailable phosphatic rock dust with sulphur dioxide and oxides of nitrogen, which will react with phosphate rock to form available phosphates, passing the substantially unset mixture to a zone in which controlled pressures may be maintained, agitating and digesting the mixture under superatmospheric temperature and pressure, subsequently releasing the pressure on said zone, cooling the material therein to effect crystallization of the solid reaction product, reducing the pressure on said zone below atmospheric, and heating the contents of the zone to dry the same.

8. A process of preparing phosphatic fertilizer comprising mixing a water sludge of unavailable phosphatic rock dust with sulphur dioxide and oxides of nitrogen, which will react with phosphate rock to form available phosphates, passing the substantially unset mixture to a zone in which controlled pressures may be maintained, agitating and digesting the mixture under superatmospheric temperature and pressure, subsequently releasing the pressure on said zone, cooling the material therein to effect crystallization of the solid reaction product, reducing the pressure on said zone below atmospheric, heating the contents of the zone to dry the same, and agitating the mass during drying.

In testimony whereof we affix our signatures.

BEVERLY OBER.
EDWARD H. WIGHT.